(12) United States Patent
Sakurai (10) Patent No.: US 12,288,890 B2
(45) Date of Patent: Apr. 29, 2025

(54) POWER STORAGE MODULE

(71) Applicant: HONDA MOTOR CO., LTD., Tokyo (JP)

(72) Inventor: Atsushi Sakurai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 1351 days.

(21) Appl. No.: 16/904,595

(22) Filed: Jun. 18, 2020

(65) Prior Publication Data
US 2020/0403199 A1    Dec. 24, 2020

(30) Foreign Application Priority Data

Jun. 21, 2019    (JP) .................... 2019-115796

(51) Int. Cl.
*H01M 50/24* (2021.01)
*H01M 10/42* (2006.01)
(Continued)

(52) U.S. Cl.
CPC ....... *H01M 50/24* (2021.01); *H01M 10/4257* (2013.01); *H01M 2010/4271* (2013.01);
(Continued)

(58) Field of Classification Search
CPC .................................................. H01M 50/11
See application file for complete search history.

(56) References Cited

U.S. PATENT DOCUMENTS

2010/0075216 A1\* 3/2010 Yoo ................. H01M 10/425
429/151
2012/0064383 A1    3/2012 Tonomura et al.
(Continued)

FOREIGN PATENT DOCUMENTS

CN    104011901    8/2014
CN    104704647    6/2015
(Continued)

OTHER PUBLICATIONS

Japanese Notice of Allowance for Japanese Patent Application No. 2019-115796 mailed Aug. 1, 2023.
(Continued)

*Primary Examiner* — Maria Laios
(74) *Attorney, Agent, or Firm* — Amin, Turocy & Watson, LLP (57) ABSTRACT

Occurrence of a problem in a power storage module due to a force such as an impact from outside can be inhibited. The power storage module includes a battery cell 2 having electrode terminals 2A and 2B, an external connector 3 electrically connected to the electrode terminals, and a battery case which houses the battery cell and the external connector. The battery case includes a case main body 5 formed in a tubular shape and having an inside serving as a housing space 10 in which the battery cell and the external connector are housed. The external connector is fixed to the battery case. The electrode terminals and the external connector are disposed at one opening end portion 18A of the case main body. The electrode terminals and the external connector are positioned to be offset from each other in a direction perpendicular to an axial direction of the case main body.

6 Claims, 6 Drawing Sheets

(51) Int. Cl.
   *H01M 50/211*    (2021.01)
   *H01M 50/55*     (2021.01)
   *H01M 50/553*    (2021.01)

(52) U.S. Cl.
   CPC .......... *H01M 50/211* (2021.01); *H01M 50/55* (2021.01); *H01M 50/553* (2021.01)

(56) References Cited

U.S. PATENT DOCUMENTS

| | | | |
|---|---|---|---|
| 2015/0243450 A1 | 8/2015 | Shimoda et al. | |
| 2016/0072163 A1* | 3/2016 | Tsuruta | H01M 50/224 228/179.1 |
| 2017/0084885 A1* | 3/2017 | Tononishi | H01M 50/20 |
| 2017/0263903 A1* | 9/2017 | Petrevski | H01M 50/209 |
| 2017/0324131 A1 | 11/2017 | Sumida et al. | |
| 2022/0344741 A1* | 10/2022 | Zeng | H01M 10/6566 |

FOREIGN PATENT DOCUMENTS

| | | |
|---|---|---|
| CN | 107004512 | 8/2017 |
| CN | 107112142 | 8/2017 |
| CN | 107667442 | 2/2018 |
| JP | 05-290828 | 11/1993 |
| JP | 2005-136153 | 5/2005 |
| JP | 2007-172893 | 7/2007 |
| JP | 2009-176689 | 8/2009 |
| JP | 2010-027485 | 2/2010 |
| JP | 2010-135148 | 6/2010 |
| JP | 2013-020754 | 1/2011 |
| JP | 2012-079666 | 4/2012 |
| JP | 2014-078371 | 5/2014 |
| JP | 2014-135162 | 7/2014 |
| JP | 2014-175128 | 9/2014 |
| JP | 2014-203741 | 10/2014 |
| JP | 2014-532958 | 12/2014 |
| JP | 2015-011851 | 1/2015 |
| JP | 2016-046127 | 4/2016 |
| JP | 2017-123298 | 7/2017 |
| JP | 2018-037216 | 3/2018 |
| JP | 2018-521447 | 8/2018 |
| WO | 2018/190435 | 10/2018 |

OTHER PUBLICATIONS

Japanese Office Action for Japanese Patent Application No. 2019-115796 mailed Apr. 5, 2022.
Japanese Office Action for Japanese Patent Application No. 2019-115796 mailed Aug. 23, 2022.
Chinese Office Action for Chinese Patent Application No. 202010556983.2 mailed Nov. 16, 2022.
Chinese Office Action for Chinese Patent Application No. 202010556983.2 mailed Apr. 22, 2023.
Chinese Office Action and Search Report for Chinese Patent Application No. 202010556983.2 mailed Jun. 15, 2022.

* cited by examiner

POWER STORAGE MODULE

CROSS-REFERENCE TO RELATED APPLICATION

Priority is claimed on Japanese Patent Application No. 2019-115796, filed Jun. 21, 2019, the content of which is incorporated herein by reference.

BACKGROUND OF THE INVENTION

Field of the Invention

The present invention relates to a power storage module.

Description of Related Art

Patent Document 1 (Japanese Unexamined Patent Application, First Publication No. 2009-176689) discloses a power storage module in which battery cells are housed in a battery case (exterior case).

SUMMARY OF THE INVENTION

Incidentally, a power storage module of this type includes an external connector disposed to be exposed outside of a battery case and configured to electrically connect the power storage module (particularly battery cells) to an external device. Therefore, when an external force such as an impact or a load caused by the power storage module being dropped or the like acts on the external connector and the external connector is moved inside the battery case, a problem may occur in the power storage module. For example, when the external connector is moved inside the battery case, there is a likelihood that the external connector may collide with the electrode terminals of the battery cells, causing a problem to occur in the electrode terminals.

The present invention has been made in view of the above circumstances, and an objective thereof is to provide a power storage module in which occurrence of a problem due to a force such as an impact from outside can be inhibited.

In order to achieve the above-described objective, a power storage module according to the present invention employ the following configurations.

(1) A power storage module (for example, a power storage module 1 in an embodiment) according to an aspect of the present invention includes a battery cell (for example, a battery cell 2 in the embodiment) having an electrode terminal (for example, electrode terminals 2A, 2B in the embodiment), an external connector (for example, an external connector 3 in the embodiment) electrically connected to the electrode terminal, and a battery case (for example, a battery case 4 in the embodiment) which houses the battery cell and the external connector, in which the battery case includes a case main body (for example, a case main body 5 in the embodiment) formed in a tubular shape and having an inside serving as a housing space (for example, a housing space 10 in the embodiment) in which the battery cell and the external connector are housed, the external connector is fixed to the battery case, the electrode terminal and the external connector are disposed at one opening end portion (for example, one opening end portion 18A in the embodiment) of the case main body, and the electrode terminal and the external connector are positioned to be offset from each other in a direction perpendicular to an axial direction of the case main body.

(2) In the aspect of the above-mentioned (1), the external connector may be disposed close to an inner surface of the case main body forming the housing space and then fixed to the case main body.

(3) In the aspect of the above-mentioned (1) or (2), a part of the external connector may be disposed to overlap the one opening end portion of the case main body in the axial direction.

(4) In the aspect of any one of the above-mentioned (1) to (3), a plurality of battery cells may be stacked in a direction perpendicular to the axial direction in the housing space, the case main body may include a tubular part (for example, a tubular part 11 in the embodiment) formed in a tubular shape and constituting the housing space, and a partition wall part (for example, a partition wall part 12 in the embodiment) connected to an inner surface of the tubular part and partitioning the housing space into a plurality of segmented spaces (for example, segmented spaces 17 in the embodiment) aligned in a stacking direction of the plurality of battery cells, and a part of the external connector may be disposed to overlap the tubular part and the partition wall part in the axial direction.

(5) In the aspect of any one of the above-mentioned (1) to (4), the power storage module may further include a control board (for example, a control board 8 in the embodiment) housed in the housing space and electrically connected to the battery cells and the external connector, in which the control board may be disposed between the battery cells and the inner surface of the case main body in a direction perpendicular to the axial direction of the case main body.

(6) In the aspect of the above-mentioned (5), the external connector and the control board may be positioned adjacent to the battery cells on one side in a direction perpendicular to the axial direction of the case main body.

(7) In the aspect of any one of the above-mentioned (1) to (6), the battery cells and the external connector may be electrically connected by a cable (for example, a cable 6 in the embodiment) disposed in the housing space, and at least a part of the cable may be disposed between the battery cells and the inner surface of the case main body in a direction perpendicular to the axial direction of the case main body.

(8) In the aspect of the above-mentioned (7), the external connector and a part of the cable may be positioned adjacent to the battery cells on one side in a direction perpendicular to the axial direction of the case main body.

According to the aspect (1) described above, the external connector disposed at one opening end portion of the case main body is fixed to the battery case. Therefore, even when an external force such as an impact or a load from outside of the battery case acts on a portion of the battery case on one opening end portion side of the case main body in the axial direction of the case main body, the external connector can be inhibited from being moved inside the case main body in the axial direction of the case main body.

According to the aspect (1) described above, the electrode terminal of the battery cell and the external connector are positioned to be offset from each other in a direction perpendicular to the axial direction of the case main body. That is, the electrode terminal and the external connector are disposed at positions that do not overlap each other when viewed from the axial direction of the case main body. Therefore, even when it is assumed that the external connector is moved inside the case main body due to an external force from outside of the battery case, the external connector is prevented from being in contact with the electrode terminal of the battery cell. Thereby, occurrence of a problem in the electrode terminal due to the external connector can be prevented. That is, protection of the electrode terminal can be achieved.

From the above, occurrence of a problem in the power storage module due to a force such as an impact from outside can be inhibited.

According to the aspect (2) described above, the external connector is fixed to the case main body at a position close to the inner surface of the case main body having high rigidity. Therefore, the external connector can be effectively inhibited from being moved in the axial direction by an external force from the axial direction of the case main body compared to a case in which the external connector is positioned away from the inner surface of the case main body.

According to the aspect (3) described above, the external connector is supported by the case main body in the axial direction thereof. Here, rigidity of the case main body is particularly high in the axial direction of the case main body. Therefore, even when an external force from the axial direction of the case main body acts on the case main body, the case main body is not easily deformed. Thereby, even when an external force from the axial direction of the case main body acts on the external connector, the external connector can be more effectively inhibited from being moved in the axial direction.

According to the aspect (4) described above, since the case main body includes the partition wall part, heat generated in the battery cells housed in the central portion of the housing space in the stacking direction can be efficiently transferred to the tubular part through the partition wall part. Thereby, heat of the battery cells positioned in the central portion of the housing space can be effectively dissipated to the outside of the case main body. Accordingly, heat dissipation of the plurality of stacked battery cells can be improved.

According to the aspect (4) described above, the external connector is supported by both the tubular part and the partition wall part from the axial direction of the case main body. That is, a portion of the external connector supported by the case main body in the axial direction thereof becomes large. Thereby, even when an external force from the axial direction of the case main body acts on the external connector, the external connector can be more effectively inhibited from being moved in the axial direction.

According to the aspect (5) described above, the control board is disposed in the housing space of the case main body, and thereby the control board can be protected against an external force from outside of the battery case.

According to the aspect (5) described above, since the control board is disposed to face the inner surface of the case main body, heat generated in the control board can be efficiently transferred to the case main body. That is, heat of the control board can be efficiently dissipated. Further, when the control board is in contact with the inner surface of the case main body, heat of the control board can be more efficiently transferred to the case main body.

According to the aspect (6) described above, the external connector and the control board are disposed in a same region positioned on a same side with respect to the battery cells in the housing space. Therefore, a size of the housing space can be reduced to be smaller compared to a case in which the external connector and the control board are disposed in regions different from each other in the housing space. Therefore, reduction in size of the power storage module can be achieved.

According to the aspect (7) described above, since the cable is disposed in the housing space, the cable can be protected against an external force from outside of the battery case.

According to the aspect (8) described above, the external connector and the cable are disposed in a same region positioned on a same side with respect to the battery cells in the housing space. Therefore, a size of the housing space can be reduced to be smaller compared to a case in which the external connector and the cable are disposed in regions different from each other in the housing space. Accordingly, reduction in size of the power storage module can be achieved.

DETAILED DESCRIPTION OF THE INVENTION

Hereinafter, one embodiment of the present invention will be described with reference to FIGS. 1 to 6.

Figure 1:
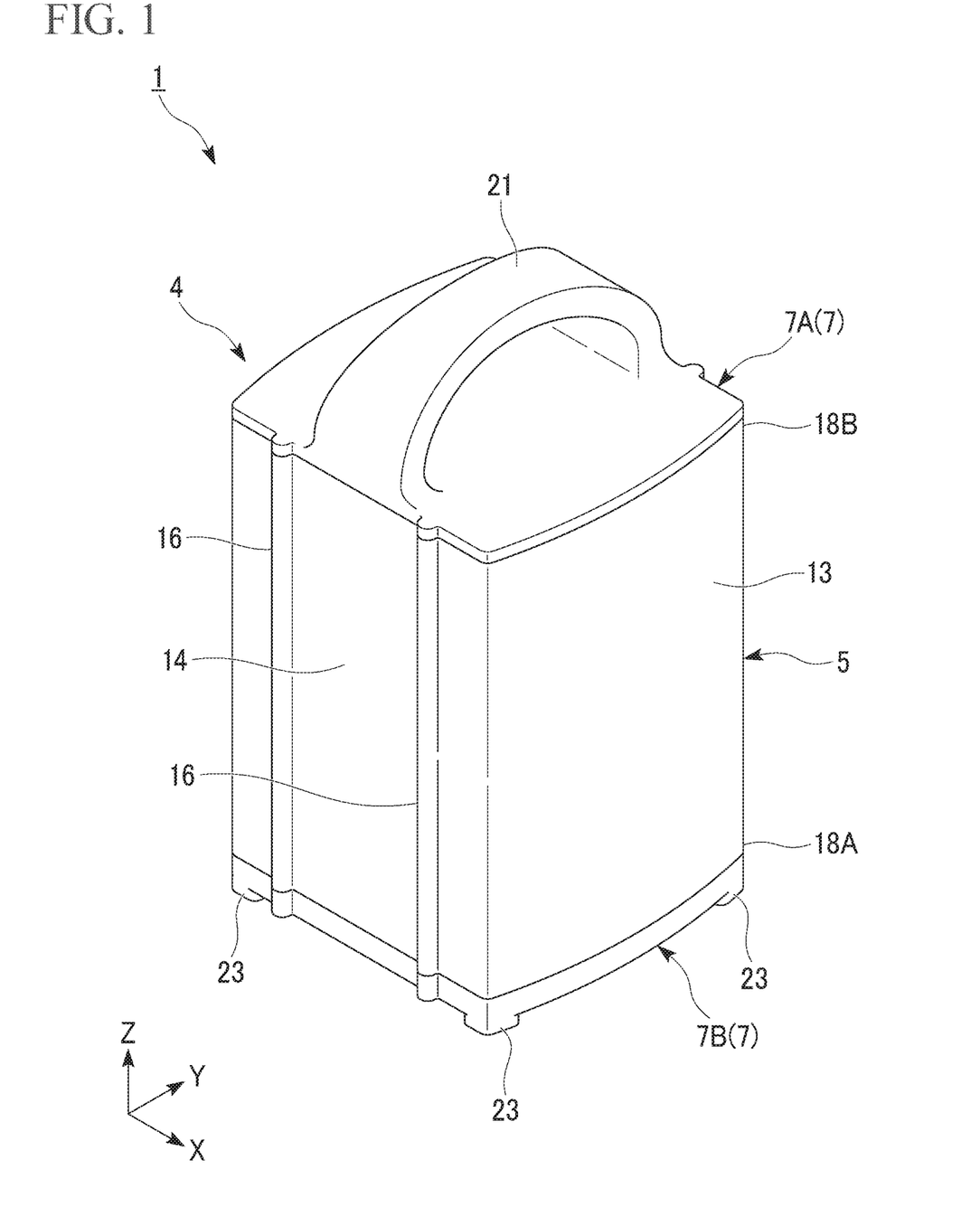
FIG. 1 is a perspective view of a power storage module of one embodiment of the present invention from a first lid part side.
Figure 2:
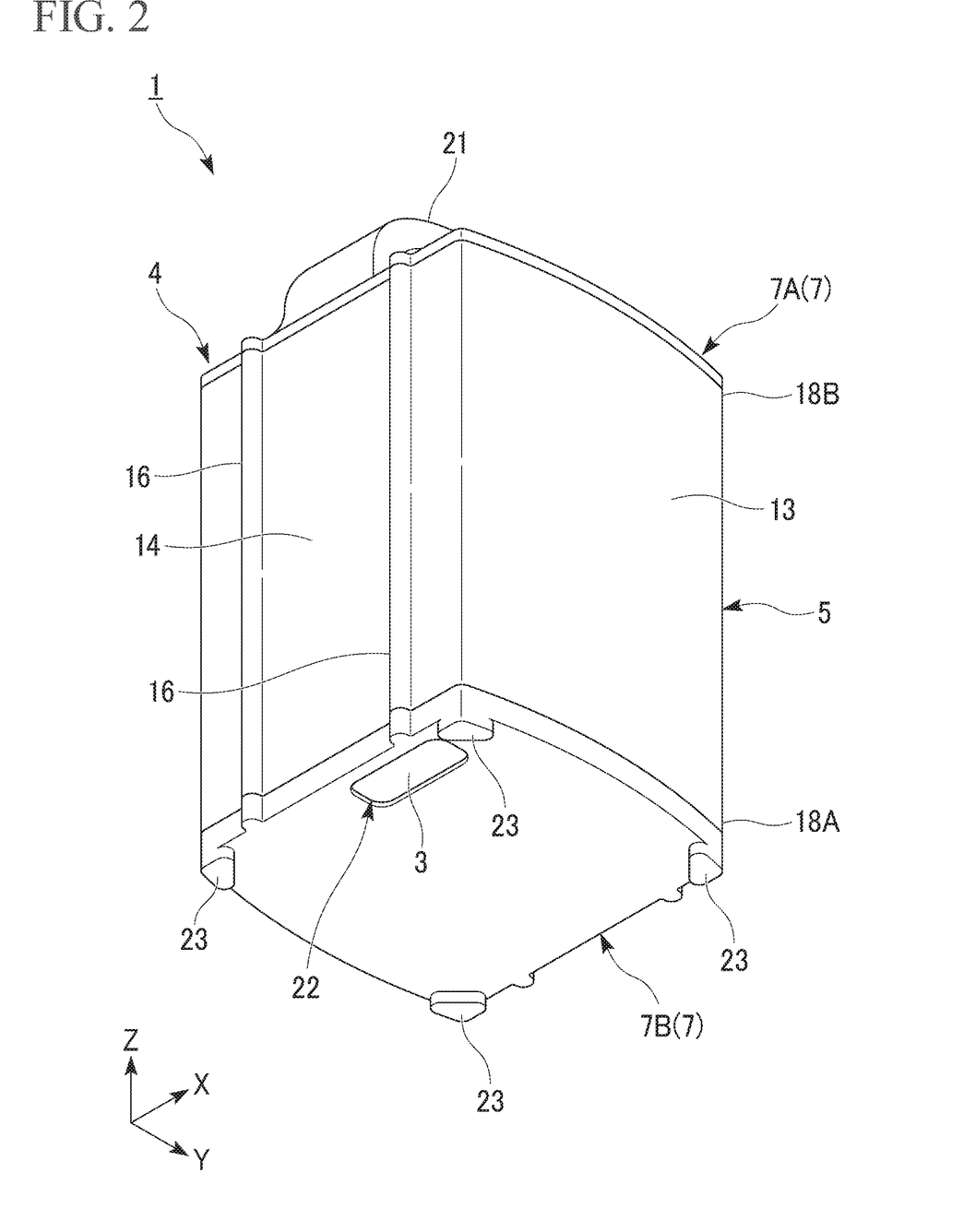
FIG. 2 is a perspective view of the power storage module of one embodiment of the present invention from a second lid part side.
Figure 3:
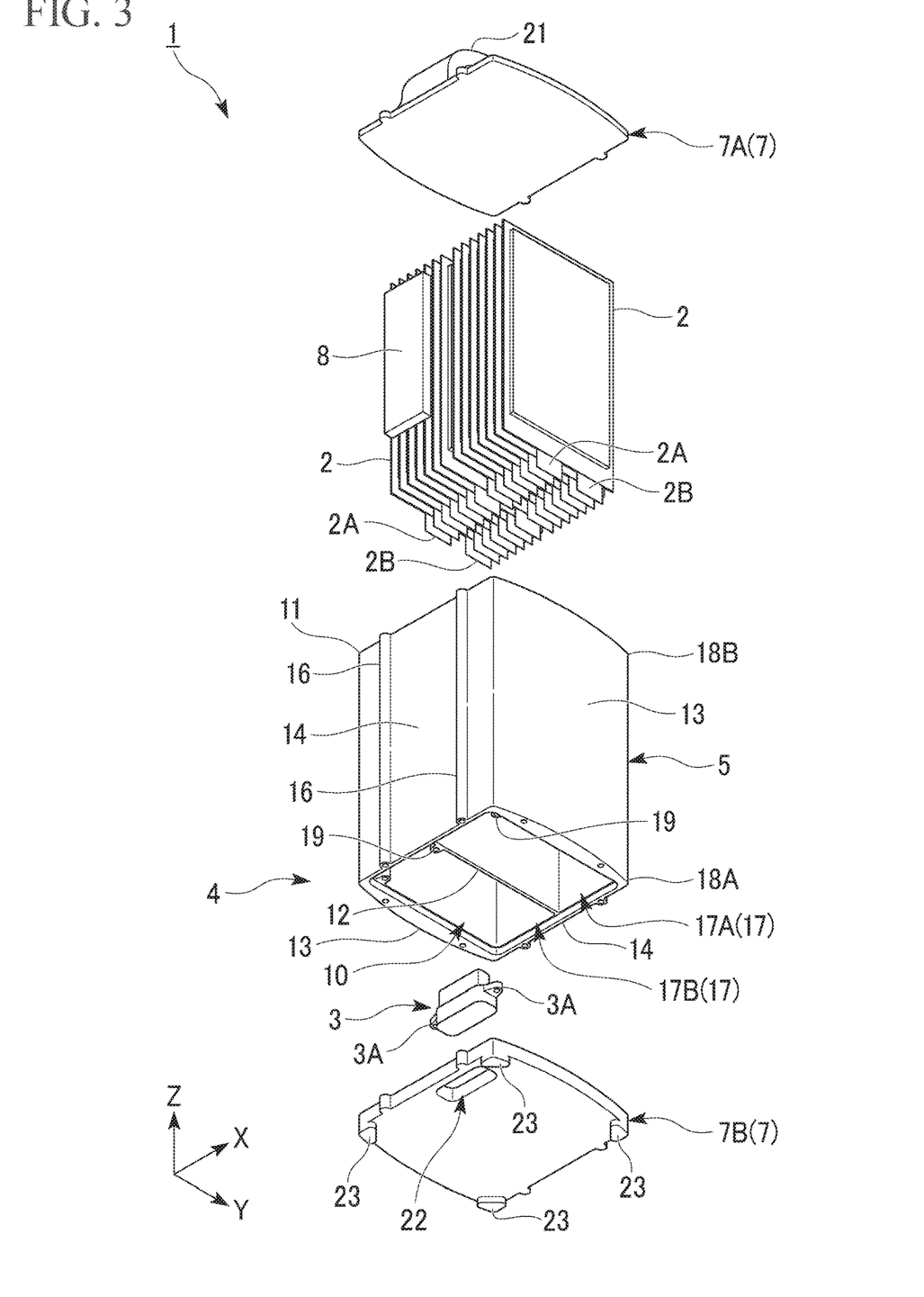
FIG. 3 is an exploded perspective view illustrating a state in which a battery cell, an external connector, a control board, and a pair of lid parts are separated from a case main body in the power storage module of the embodiment of the present invention.

As shown in FIGS. 1 to 3, a power storage module 1 according to the present embodiment includes a battery cell 2, an external connector 3, and a battery case 4 in which the battery cell 2 and the external connector 3 are housed. The battery case 4 includes a case main body 5 formed in a tubular shape. Both ends in an axial direction of the case main body 5 are open. The inside of the case main body 5 is a housing space 10 in which the battery cell 2 and the external connector 3 are housed.

In FIGS. 1 to 6, a Z-axis direction is an axial direction of the case main body 5, an X-axis direction is a first perpendicular direction perpendicular to the axial direction, and a Y-axis direction is a second perpendicular direction perpendicular to the axial direction and the first perpendicular direction.

A shape of the battery cell 2 may be arbitrary. As shown in FIGS. 3 to 6, the battery cell 2 of the present embodiment is formed in a plate shape having a thickness direction in the first perpendicular direction (X-axis direction). Specifically, the battery cell 2 is the battery cell 2 of a laminate-type in which battery elements are laminated with a pair of films. The battery cell 2 of the laminate-type may expand in the thickness direction at the time of charging and discharging, heat generation, or deterioration in performance. The battery cell 2 of the present embodiment is formed in a rectangular shape when viewed from the thickness direction, but the present invention is not limited thereto.

Figure 4:
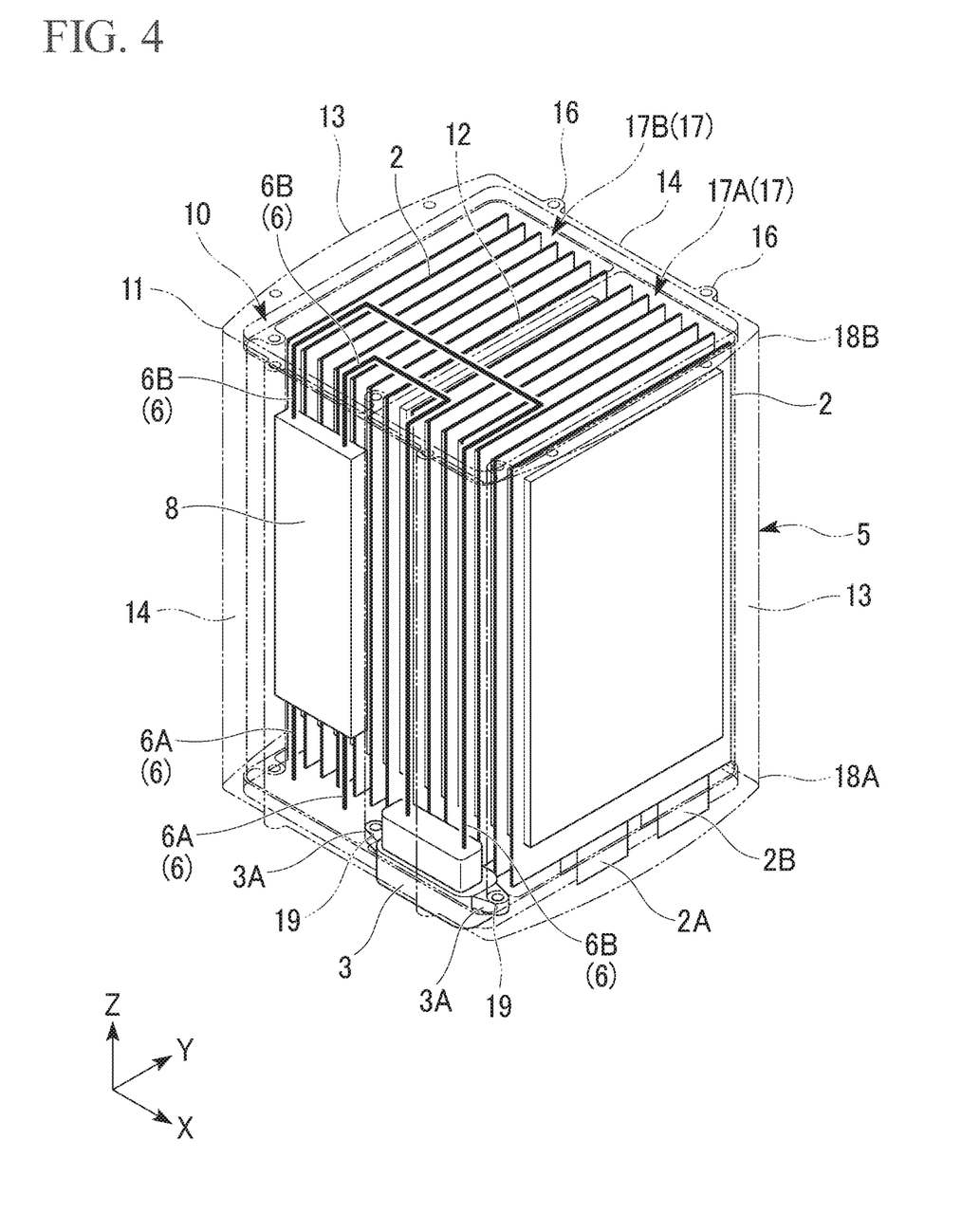
FIG. 4 is a perspective view illustrating a disposition of the battery cell, the external connector, the control board, and a cable inside the case main body in the power storage module of the embodiment of the present invention.
Figure 6:
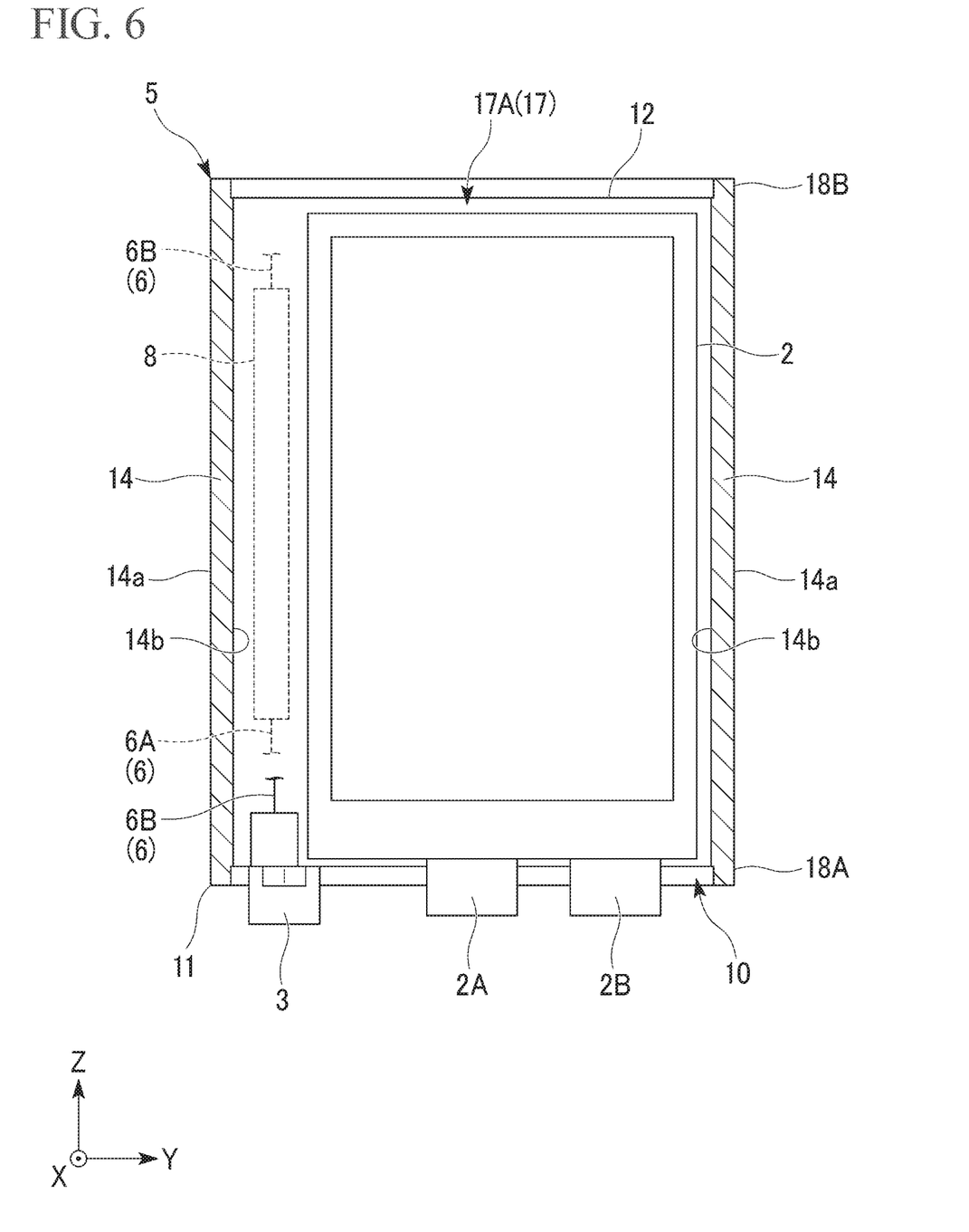
FIG. 6 is a cross-sectional view of the case main body in which the battery cell, the external connector, and the control board are disposed therein in the power storage module of the embodiment of the present invention when viewed from a stacking direction of the battery cells.

As shown in FIGS. 3, 4, and 6, the battery cell 2 has two electrode terminals 2A and 2B serving as a positive electrode and a negative electrode. The two electrode terminals 2A and 2B protrude in a same direction perpendicular to a thickness direction of a main body portion of the plate-shaped battery cell 2 from the main body portion. In the present embodiment, the electrode terminals 2A and 2B are positioned on one side in the axial direction (Z-axis negative direction side) of the case main body 5 with respect to the main body portion of the battery cell 2.

Figure 5:
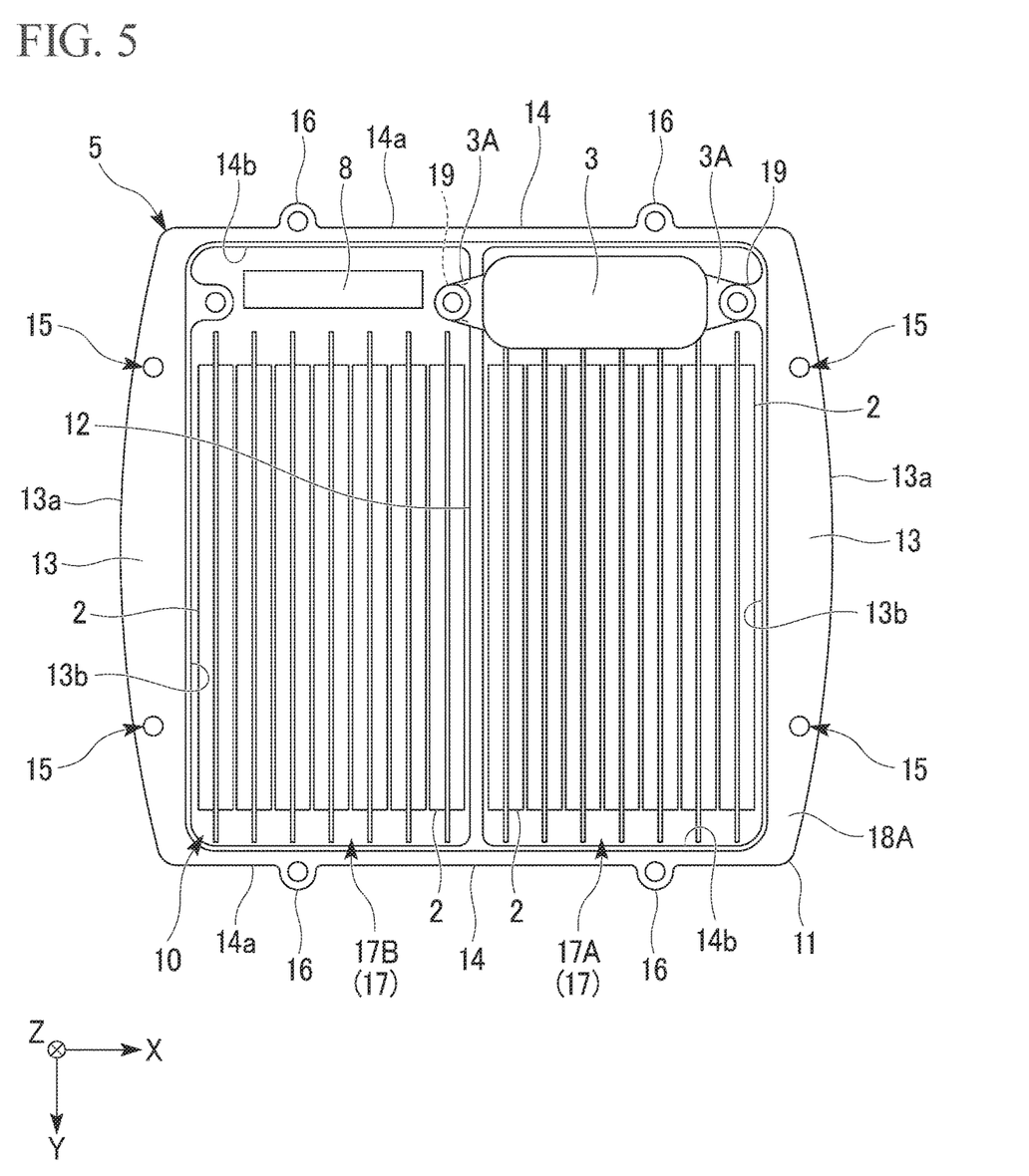
FIG. 5 is a plan view of the case main body in which the battery cell, the external connector, and the control board are disposed therein in the power storage module of the embodiment of the present invention when viewed from one opening end portion side of the case main body.

The number of battery cells 2 housed in the battery case 4 may be, for example, one. In the present embodiment, as shown in FIGS. 3 to 5, a plurality of battery cells 2 are stacked in the first perpendicular direction. That is, the plurality of battery cells 2 are stacked in the thickness direction thereof. The plurality of battery cells 2 are electrically connected in series or in parallel by connecting the electrode terminals 2A and 2B to each other as appropriate using a bus bar or a circuit board (not illustrated).

The external connector 3 is electrically connected to the electrode terminals 2A and 2B of the battery cells 2. Specifically, the battery cells 2 and the external connector 3 are electrically connected by a cable 6 disposed in the housing space 10 of the case main body 5 as shown in FIG. 4. The external connector 3 electrically connects the battery cells 2 to an external device. As shown in FIG. 2, the external connector 3 is exposed to an outward side of the battery case 4.

As shown in FIGS. 3 to 6, the case main body 5 of the battery case 4 includes a tubular part 11 and a partition wall part 12.

The tubular part 11 is formed in a tubular shape that constitutes the housing space 10 of the case main body 5. For example, the tubular part 11 may be formed in an any tubular shape such as a cylindrical shape. As shown in FIGS. 3 to 5, the tubular part 11 of the present embodiment is formed in a rectangular tubular shape having a pair of first side walls 13 and a pair of second side walls 14.

The pair of first side walls 13 are disposed with a distance therebetween in a stacking direction (first perpendicular direction, X-axis direction) of the plurality of battery cells 2. That is, the pair of first side walls 13 are positioned on both sides of the plurality of battery cells 2 housed in the housing space 10 in the stacking direction. The pair of second side walls 14 are disposed with a distance therebetween in the second perpendicular direction (Y-axis direction).

The first side walls 13 are each formed in a plate shape extending in the axial direction and the second perpendicular direction and having a thickness direction in the first perpendicular direction (stacking direction). The first side wall 13 may be formed in, for example, a flat plate shape. The first side wall 13 of the present embodiment is formed to bulge outward from the tubular part 11.

As shown in FIG. 5, an outer surface 13a of the first side wall 13 facing outward from the tubular part 11 in the first perpendicular direction is formed to be inclined toward a side outward from the tubular part 11 in the first perpendicular direction from both ends of the first side wall 13 toward a center thereof in the second perpendicular direction. Specifically, the outer surface 13a of the first side wall 13 is formed in an arc shape in which the center of the outer surface 13a in the second perpendicular direction bulges to the outward side from the tubular part 11 in the first perpendicular direction with respect to both ends of the outer surface 13a. On the other hand, an inner surface 13b of the first side wall 13 facing inward of the tubular part 11 in the first perpendicular direction is formed as a flat surface perpendicular to the first perpendicular direction. Thereby, a thickness of the first side wall 13 in the first perpendicular direction increases from both ends of the first side wall 13 toward the center in the second perpendicular direction.

A through hole 15 penetrating the tubular part 11 in the axial direction is formed in the first side wall 13. A plurality of through holes 15 (two in the illustrated example) are disposed in the first side wall 13 at intervals in the second perpendicular direction. A screw (not illustrated) for fixing a lid part 7 to be described below in the case main body 5 passes through the through hole 15. For example, a female screw that meshes with the screw may be formed in an inner circumference of the through hole 15.

The through hole 15 may be formed in a region excluding both ends of the first side wall 13 having a smaller thickness compared to other portions of the first side wall 13. Thereby, a decrease in rigidity of the first side wall 13 due to formation of the through hole 15 can be curbed.

As shown in FIGS. 3 to 6, the second side walls 14 are each formed in a plate shape extending in the axial direction and the first perpendicular direction and having a thickness direction in the second perpendicular direction. The second side wall 14 of the present embodiment is formed in a flat plate shape. That is, as shown in FIGS. 5 and 6, an outer surface 14a of the second side wall 14 facing outward from the tubular part 11 and an inner surface 14b of the second side wall 14 facing inward of the tubular part 11 are each formed as a flat surface perpendicular to the second perpendicular direction.

As shown in FIGS. 3 and 5, the second side wall 14 of the tubular part 11 includes a boss part 16 formed to protrude from the outer surface 14a thereof. The boss part 16 is formed in a tubular shape that extends in a straight line from one end to the other end of the second side wall 14 in the axial direction of the tubular part 11. A screw (not illustrated) for fixing the lid part 7 to be described below in the case main body 5 passes through the inside of the boss part 16. For example, a female screw that meshes with the screw may be formed in an inner circumference of the boss part 16. In the present embodiment, two boss parts 16 are disposed in the first perpendicular direction with a distance therebetween.

The pair of first side walls 13 and the pair of second side walls 14 may be, for example, separately formed and then fixed to each other. In the present embodiment, the pair of first side walls 13 and the pair of second side walls 14 are integrally formed.

In the tubular part 11 of the present embodiment, the length of the first side wall 13 in the second perpendicular direction and the length of the second side wall 14 in the first perpendicular direction are equal to each other. That is, the tubular part 11 of the present embodiment is formed in a square tubular shape.

As shown in FIGS. 3 to 5, the partition wall part 12 is connected to an inner surface of the tubular part 11. The partition wall part 12 partitions the housing space 10 of the tubular part 11 into a plurality of segmented spaces 17 aligned in the stacking direction (first perpendicular direction, X-axis direction) of the battery cells 2. In the present embodiment, the number of partition wall parts 12 is one, and the number of segmented spaces 17 is two.

The partition wall part 12 of the present embodiment is disposed at a central portion of the tubular part 11 in the stacking direction. Specifically, the partition wall part 12 is disposed at the middle of the housing space 10 in the stacking direction. Therefore, lengths of the two segmented spaces 17 in the stacking direction are equal to each other. Further, the partition wall part 12 may be positioned, for example, to be offset from the middle of the housing space 10 in the stacking direction. However, it is more preferable that the partition wall part 12 be positioned close to the middle (that is, a central portion) of the housing space 10.

As shown in FIGS. 5 and 6, the partition wall part 12 of the present embodiment is formed in a flat plate shape extending in the axial direction and the second perpendicular direction and having a plate thickness direction in the stacking direction of the battery cells 2. Both ends of the partition wall part 12 in the second perpendicular direction are connected to the inner surface of the tubular part 11. Specifically, both ends of the partition wall part 12 are connected to the inner surfaces 14b of the pair of second side walls 14.

As shown in FIG. 6, both ends of the partition wall part 12 in the axial direction of the tubular part 11 are positioned on a side inward from both ends in the axial direction of the tubular part 11. Therefore, the two segmented spaces 17 adjacent to each other via the partition wall part 12 are continuous with each other at both ends of the partition wall part 12 in the axial direction of the tubular part 11.

The partition wall part 12, for example, may be formed separately from the tubular part 11 and then attached to the tubular part 11. The partition wall part 12 of the present embodiment is formed integrally with the tubular part 11.

The case main body 5 configured as described above may be formed of a material having high thermal conductivity (for example, a metal material such as aluminum). The tubular part 11 and the partition wall part 12 which form the case main body 5 can be integrally manufactured by extrusion molding.

As shown in FIGS. 4 and 6, the electrode terminals 2A and 2B of the battery cells 2 and the external connector 3 housed in the housing space 10 of the case main body 5 described above are disposed at one opening end portion 18A of the case main body 5. In the present embodiment, one opening end portion 18A is one end portion of the case main body 5 positioned on the Z-axis negative direction side.

The electrode terminals 2A and 2B of the battery cells 2 and the external connector 3 are positioned to be offset from each other in a direction perpendicular to the axial direction of the case main body 5. That is, the electrode terminals 2A and 2B and the external connector 3 are disposed at positions that do not overlap each other when viewed from the axial direction of the case main body 5. In the present embodiment, the electrode terminals 2A and 2B and the external connector 3 are positioned to be offset from each other in the second perpendicular direction (Y-axis direction).

In the present embodiment, the battery cells 2 (particularly the main body portions) and the external connector 3 are disposed to be offset from each other in the second perpendicular direction. Specifically, the external connector 3 is positioned adjacent to the battery cells 2 on one side in the second perpendicular direction (Y-axis negative direction side). In FIG. 6, a part of the external connector 3 overlaps the main body portions of the battery cells 2 when viewed from the axial direction of the case main body 5, but they may not overlap.

As shown in FIGS. 4 to 6, the external connector 3 is fixed to the case main body 5. The external connector 3 may be fixed to the case main body 5, for example, at a position away from an inner surface of the case main body 5 forming the housing space 10. In the present embodiment, the external connector 3 is disposed close to the inner surface of the case main body 5 forming the housing space 10 and then fixed to the case main body 5. That is, the external connector 3 is fixed to the case main body 5 with it being positioned close to the inner surface of the case main body 5 in a direction perpendicular to the axial direction of the case main body 5.

The external connector 3 is fixed to the case main body 5 after a part thereof is disposed to overlap one opening end portion 18A of the case main body 5 in the axial direction. As shown in FIGS. 3 to 5, a part of the external connector 3 described above is a pair of protrusions 3A protruding from a main body portion of the external connector 3. The pair of protrusions 3A are positioned at both ends of the main body portion of the external connector 3 in the first perpendicular direction. The pair of protrusions 3A are disposed to overlap the tubular part 11 and the partition wall part 12 in the axial direction of the case main body 5.

The pair of protrusions 3A of the external connector 3 are overlapped on fixing parts 19 protruding from the inner surface of the tubular part 11 and an inner surface of the partition wall part 12 at one opening end portion 18A of the case main body 5 in the axial direction of the case main body 5 and then fixed by screwing or the like. When the external connector 3 is disposed close to the inner surfaces of the case main body 5 (the tubular part 11 and the partition wall part 12), the length of the protrusion 3A of the external connector 3 and the length of the fixing part 19 formed on the case main body 5 can be set to be small.

In the present embodiment, the external connector 3 (particularly the main body portion) is disposed in a first segmented space 17A among the plurality of segmented spaces 17 constituting the housing space 10.

As shown in FIGS. 1 to 3, the battery case 4 of the present embodiment further includes a pair of lid parts 7 in addition to the case main body 5. The pair of lid parts 7 covers openings at both ends of the case main body 5 in the axial direction of the case main body 5. The pair of lid parts 7 are detachably attached to the case main body 5 by screwing or the like. The lid parts 7 are each formed in a rectangular shape corresponding to the case main body 5 when viewed in the axial direction.

Of the pair of lid parts 7, a first lid part 7A is disposed at the other opening end portion 18B of the case main body 5 (the other end portion of the case main body 5 positioned on the Z-axis positive direction side). A grip part 21 for carrying the power storage module 1 is provided on the first lid part 7A. The grip part 21 is formed in a curved rod shape or a strip plate shape. Both ends of the grip part 21 are connected to an outer surface of the first lid part 7A facing outward from the case main body 5. When the power storage module 1 includes the grip part 21, the power storage module 1 can be used as a portable power storage module.

In the present embodiment, the first lid part 7A including the grip part 21 is formed of a resin having a lower thermal conductivity than that of the case main body 5.

Of the pair of lid parts 7, a second lid part 7B is disposed at one opening end portion 18A of the case main body 5. An exposure hole 22 that exposes the external connector 3 to an outward side of the battery case 4 is formed in the second lid part 7B. The exposure hole 22 penetrates the second lid part 7B in the axial direction of the case main body 5. The external connector 3 may be inserted into, for example, the exposure hole 22. The external connector 3 may, for example, protrude from an outer surface of the second lid part 7B facing outward from the case main body 5 but does not protrude in the present embodiment.

A plurality of leg parts 23 are provided on the second lid part 7B. The plurality of leg parts 23 protrude from the outer surface of the second lid part 7B. Specifically, the plurality of leg parts 23 are disposed at four corners of the outer surface of the second lid part 7B formed in a rectangular shape. When the plurality of leg parts 23 are provided, the outer surface of the second lid part 7B and the external connector 3 can be inhibited or prevented from being in contact with the ground or the like in a state in which the power storage module 1 is placed on the ground or the like with the second lid part 7B on a lower side in the vertical direction. Further, when the external connector 3 protrudes from the outer surface of the second lid part 7B, a protrusion height of the leg parts 23 with respect to the outer surface of the second lid part 7B may be larger than a protrusion height of the external connector 3.

In the present embodiment, the second lid part 7B including the leg parts 23 is formed of a resin having a lower thermal conductivity than that of the case main body 5 as in the first lid part 7A.

Although not shown, sealing parts may be respectively provided between the above-described lid parts 7 and the opening end portions 18A and 18B of the case main body 5 to fill gaps therebetween. In this case, it is possible to prevent moisture from entering the inside of the case main body 5 through the gaps between lid parts 7 and the opening end portions 18A and 18B of the case main body 5.

As shown in FIGS. 3 to 6, the power storage module 1 of the present embodiment further includes a control board 8. The control board 8 controls charging and discharging of the battery cells 2. Similarly to the battery cells 2 and the external connector 3, the control board 8 is housed in the housing space 10 of the case main body 5.

As shown in FIG. 4, the control board 8 is electrically connected to the battery cells 2 and the external connector 3. Specifically, the battery cells 2 and the control board 8 are electrically connected by a first cable 6A. The first cable 6A is connected to the electrode terminals 2A and 2B of the battery cells 2. For example, positive and negative power supply lines and a voltage detection line may be included in the first cable 6A. The voltage detection line is a line for detecting voltages of a plurality of or individual battery cells 2.

On the other hand, the control board 8 and the external connector 3 are electrically connected by a second cable 6B. For example, positive and negative power supply lines, an external power supply line, and a signal line may be included in the second cable 6B. The signal line is a line for transmitting and receiving electric signals of various types between the control board 8 and an external device.

The first and second cables 6A and 6B form the cable 6 connecting the battery cells 2 and the external connector 3.

As shown in FIGS. 5 and 6, the control board 8 is disposed between the battery cells 2 and the inner surface of the case main body 5 in the second perpendicular direction (Y-axis direction). In the present embodiment, similarly to the external connector 3, the control board 8 is positioned adjacent to the battery cells 2 on one side in the second perpendicular direction (Y-axis negative direction side).

That is, both the external connector 3 and the control board 8 are positioned adjacent to the battery cells 2 on one side in the second perpendicular direction.

As shown in FIG. 6, similarly to the external connector 3 and the control board 8, a part of the cable 6 connected to the battery cells 2, the external connector 3, and the control board 8 is disposed between the battery cells 2 and the inner surface of the case main body 5 in the second perpendicular direction. In the present embodiment, similarly to the external connector 3 and the control board 8, a part of the cable 6 is positioned adjacent to the battery cells 2 on one side in the second perpendicular direction (Y-axis negative direction side). That is, the external connector 3, the control board 8, and a part of the cable 6 are all positioned adjacent to the battery cells 2 on one side in the second perpendicular direction (Y-axis negative direction side).

As shown in FIGS. 5 and 6, the control board 8 of the present embodiment is disposed to extend along the inner surface of the case main body 5 facing the control board 8. That is, the control board 8 is disposed so that a plate thickness direction thereof is perpendicular to the inner surface of the case main body 5 facing the control board 8. The control board 8 may be in contact with, for example, the inner surface of the case main body 5.

Of the plurality of segmented spaces 17, the control board 8 may be disposed in, for example, the same first segmented space 17A as the external connector 3 is disposed. In the present embodiment, as shown in FIGS. 4 and 5, the control board 8 is disposed in a second segmented space 17B that is different from the first segmented space 17A among the plurality of segmented spaces 17. Therefore, as shown in FIG. 4, the second cable 6B connecting the control board 8 and the external connector 3 is disposed to extend between the first and second segmented spaces 17A and 17B. Specifically, the second cable 6B is disposed to straddle the partition wall part 12 at one end of the partition wall part 12 positioned on the other opening end portion 18B side of the case main body 5.

As described above, according to the power storage module 1 of the present embodiment, the external connector 3 disposed at one opening end portion 18A of the case main body 5 is fixed to the battery case 4. Therefore, even when an external force such as an impact or a load from the outside of the battery case 4 acts on a portion of the battery case 4 on one opening end portion 18A side of the case main body 5 in the axial direction of the case main body 5, the external connector 3 can be inhibited from being moved to an inward side of the case main body 5 in the axial direction of the case main body 5 (Z-axis positive direction).

According to the power storage module 1 of the present embodiment, the electrode terminals 2A and 2B of the battery cells 2 and the external connector 3 are positioned to be offset from each other in a direction perpendicular to the axial direction of the case main body 5. Therefore, even when it is assumed that the external connector 3 is moved inside the case main body 5 due to an external force from outside of the battery case 4, the external connector 3 is prevented from being in contact with the electrode terminals 2A and 2B of the battery cells 2. Thereby, occurrence of a problem in the electrode terminals 2A and 2B due to the external connector 3 can be prevented. That is, protection of the electrode terminals 2A and 2B can be achieved.

In the power storage module 1 of the present embodiment, the grip part 21 is provided on the first lid part 7A disposed on the other opening end portion 18B side of the case main body 5. Therefore, even when an external force from outside of the battery case 4 acts on a portion of the case main body 5 on the other opening end portion 18B side, the external force can be absorbed in the grip part 21 of the first lid part 7A. Thereby, the first lid part 7A can be inhibited from being deformed to the inward side of the case main body 5 due to an external force from outside of the battery case 4.

In the power storage module 1 of the present embodiment, a thickness of the first side wall 13 of the case main body 5 in the first perpendicular direction increases from both ends of the first side wall 13 toward the center in the second perpendicular direction. Further, the second side wall 14 of the case main body 5 includes the boss part 16 formed to protrude from the outer surface thereof. Further, the pair of second side walls 14 of the case main body 5 are connected by the partition wall part 12 positioned between the pair of first side walls 13. Thereby, rigidity of the first and second side walls 13 and 14 can be improved. Therefore, even when an external force from outside of the battery case 4 acts on the first side walls 13 and the second side walls 14 of the case main body 5, the first and second side walls 13 and 14 are inhibited from being deformed to the inward side of the case main body 5.

From the above, occurrence of a problem in the power storage module 1 due to a force such as an impact from outside can be inhibited.

According to the power storage module 1 of the present embodiment, the external connector 3 is fixed to the case main body 5 at a position close to the inner surface of the case main body 5 having high rigidity. Therefore, the external connector 3 can be effectively inhibited from being moved in the axial direction by an external force from the axial direction of the case main body 5 compared to a case in which the external connector 3 is positioned away from the inner surface of the case main body 5.

According to the power storage module 1 of the present embodiment, the protrusions 3A of the external connector 3 are disposed to overlap one opening end portion 18A of the case main body 5 in the axial direction of the case main body 5. Thereby, the external connector 3 is supported by the case main body 5 in the axial direction thereof. Here, since rigidity of the case main body 5 is particularly high in the axial direction of the case main body 5, even when an external force from the axial direction of the case main body 5 acts on the case main body 5, the case main body 5 is not easily deformed. Thereby, even when an external force from the axial direction of the case main body 5 acts on the external connector 3, the external connector 3 can be more effectively inhibited from being moved in the axial direction.

According to the power storage module 1 of the present embodiment, the housing space 10 of the case main body 5 is partitioned by the partition wall part 12 into a plurality of segmented spaces 17 aligned in the stacking direction of the plurality of battery cells 2. Particularly, the partition wall part 12 is disposed at the central portion of the case main body 5 in the stacking direction. Therefore, heat generated at the battery cells 2 housed in the central portion of the housing space 10 in the stacking direction can be efficiently transferred to the tubular part 11 through the partition wall part 12. Thereby, heat of the battery cells 2 positioned in the central portion of the housing space 10 can be effectively dissipated to the outside of the case main body 5. Accordingly, heat dissipation of the plurality of stacked battery cells 2 can be improved.

According to the power storage module 1 of the present embodiment, the protrusions 3A of the external connector 3 are disposed to overlap both the tubular part 11 and the partition wall part 12 in the axial direction of the case main body 5. Thereby, the external connector 3 is supported by both the tubular part 11 and the partition wall part 12 from the axial direction of the case main body 5. That is, a portion of the external connector 3 supported by the case main body 5 in the axial direction thereof becomes large. Thereby, even when an external force from the axial direction of the case main body 5 acts on the external connector 3, the external connector 3 can be more effectively inhibited from being moved in the axial direction.

According to the power storage module 1 of the present embodiment, the control board 8 is disposed in the housing space 10 of the case main body 5, and thereby the control board 8 can be protected against an external force from outside of the battery case 4.

Further, since the control board 8 is disposed to face the inner surface of the case main body 5, heat generated in the control board 8 can be efficiently transferred to the case main body 5. That is, heat of the control board 8 can be efficiently dissipated. Further, when the control board 8 is in contact with the inner surface of the case main body 5, heat of the control board 8 can be more efficiently transferred to the case main body 5.

According to the power storage module 1 of the present embodiment, the control board 8 is disposed to extend along the inner surface of the case main body 5 facing the control board 8. Therefore, heat of the control board 8 can be more efficiently transferred to the case main body 5 compared to a case in which the control board 8 is disposed to extend in a direction away from the inner surface of the case main body 5. Reduction in size of the power storage module 1 can also be achieved by reducing a region in which the control board 8 is disposed in the housing space 10.

According to the power storage module 1 of the present embodiment, the cable 6 electrically connecting the battery cells 2 and the external connector 3 is disposed in the housing space 10 of the case main body 5. Therefore, the cable 6 can be protected against an external force from outside of the battery case 4.

According to the power storage module 1 of the present embodiment, the external connector 3, the control board 8, and a part of the cable 6 are positioned adjacent to the battery cells 2 on one side in a direction perpendicular to the axial direction of the case main body 5 (Y-axis negative direction side). That is, the external connector 3, the control board 8, and the cable 6 are disposed in a same region positioned on a same side with respect to the battery cells 2 in the housing space 10. Therefore, the size of the housing space 10 can be reduced to be smaller compared to a case in which the external connector 3, the control board 8, and the cable 6 are disposed in regions different from each other in the housing space 10. Therefore, reduction in size of the power storage module 1 can be achieved.

While details of the present invention have been described above, the present invention is not limited to the above-described embodiment, and various modifications can be made without departing from the spirit of the present invention.

In the power storage module of the present invention, the external connector 3 may be fixed to, for example, the lid part 7.

In the power storage module of the present invention, the number of partition wall parts 12 may be, for example, of a plural number. In this case, a plurality of partition wall parts 12 may be disposed at intervals in the stacking direction of the plurality of battery cells 2. In this configuration, the housing space 10 of the case main body 5 is partitioned into three or more segmented spaces 17 aligned in the stacking direction. Even in such a configuration, it is preferable that at least one partition wall part 12 be positioned at the central portion of the case main body 5 in the stacking direction (at the middle of the housing space 10 or close to the middle).

In the power storage module of the present invention, the case main body 5 in a tubular shape may not include, for example, the partition wall part 12 and may be formed by only the tubular part 11.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

EXPLANATION OF REFERENCES

1 Power storage module
2 Battery cell
2A, 2B Electrode terminal
3 External connector
3A Protrusion
4 Battery case
5 Case main body
6 Cable
7 Lid part
8 Control board
10 Housing space
11 Tubular part
12 Partition wall part
13 First side wall
14 Second side wall
17 Segmented space
18A One opening end portion
18B The other opening end portion
21 Grip part
22 Exposure hole
23 Leg part

What is claimed is:

1. A power storage module comprising:
   a plurality of battery cells, wherein a battery cell of the plurality of battery cells comprises an electrode terminal;
   an external connector electrically connected to the electrode terminal; and
   a battery case which houses the plurality of battery cells and the external connector, wherein
   the battery case comprises a case main body formed in a tubular shape and having an inside serving as a housing space in which the plurality of battery cells and the external connector are housed,
   the external connector is fixed to the battery case,
   the electrode terminal and the external connector are disposed at a first opening end portion of the case main body,
   the electrode terminal and the external connector are positioned to be offset from each other in a direction perpendicular to an axial direction of the case main body,
   the battery case further comprises a lid part provided at a second opening end portion of the case main body,
   a grip part for carrying the power storage module is provided on an outer surface of the lid part,
   the power storage module further comprises a control board housed in the housing space and electrically connected to the plurality of battery cells and the external connector, wherein the control board is disposed between the plurality of battery cells and an inner surface of the case main body in a direction perpendicular to the axial direction of the case main body,
   the plurality of battery cells are stacked in a direction perpendicular to the axial direction in the housing space,
   the case main body comprises:
      a tubular part formed in a tubular shape and constituting the housing space, and
      a partition wall part connected to an inner surface of the tubular part and partitioning the housing space into a plurality of segmented spaces aligned in a stacking direction of the plurality of battery cells, and
      a part of the external connector is disposed to overlap the tubular part and the partition wall part in the axial direction.

2. The power storage module according to claim 1, wherein the external connector is disposed along one side of the inner surface of the case main body forming the housing space and fixed to the case main body.

3. The power storage module according to claim 1, wherein a part of the external connector is disposed to overlap the first opening end portion of the case main body in the axial direction.

4. The power storage module according to claim 1, wherein the external connector and the control board are positioned adjacent to the plurality of battery cells on one side in a direction perpendicular to the axial direction of the case main body.

5. The power storage module according to claim 1, wherein
   the plurality of battery cells and the external connector are electrically connected by a cable disposed in the housing space, and
   at least a part of the cable is disposed between the plurality of battery cells and the inner surface of the case main body in a direction perpendicular to the axial direction of the case main body.

6. The power storage module according to claim 5, wherein the external connector and a part of the cable are positioned adjacent to the plurality of battery cells on one side in a direction perpendicular to the axial direction of the case main body.

* * * * *